N. P. TODD.
JELLY JAR.

No. 184,442.  Patented Nov. 14, 1876.

WITNESSES:
Chas. Nida
John Goethals

INVENTOR:
N. P. Todd
BY Munn & Co
ATTORNEYS.

UNITED STATES PATENT OFFICE.

NICHOLAS P. TODD, OF SHAMONG, NEW JERSEY.

IMPROVEMENT IN JELLY-JARS.

Specification forming part of Letters Patent No. 184,442, dated November 14, 1876; application filed September 16, 1876.

Figure 1:
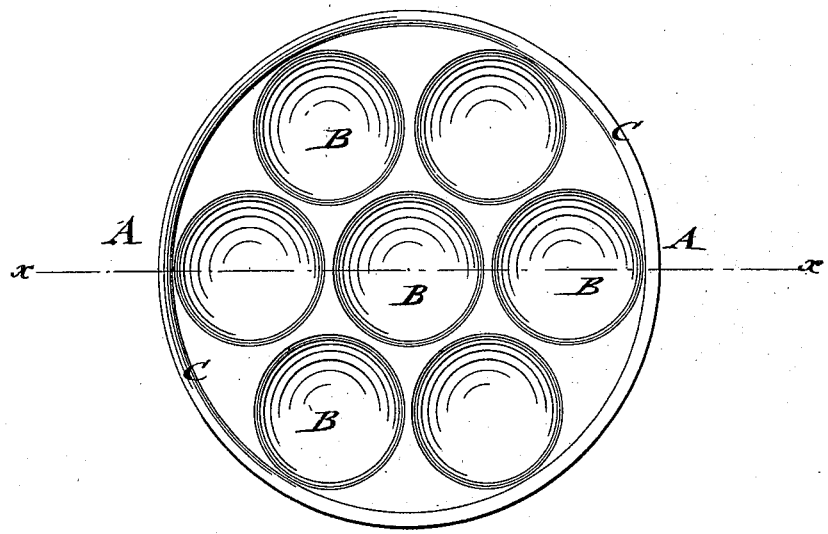
Figure 2:
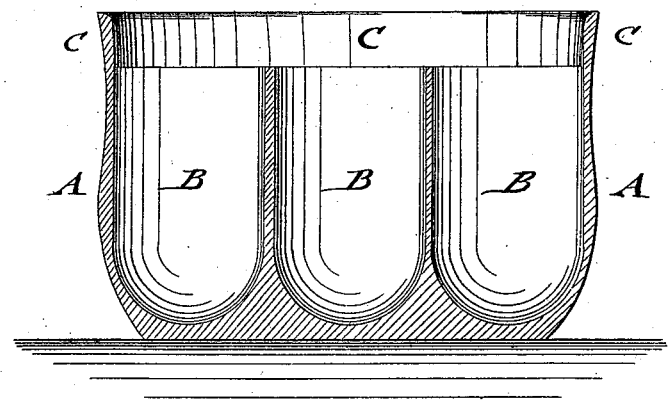

To all whom it may concern:

Be it known that I, NICHOLAS P. TODD, of Shamong, in the county of Burlington and State of New Jersey, have invented a new and Improved Jelly-Jar, of which the following is a specification:

In the accompanying drawing, Figure 1 represents a top view, and Fig. 2 a vertical central section on line $x\,x$, Fig. 1, of my improved jelly-jar.

Similar letters of reference indicate corresponding parts.

The invention has reference to an improved jelly-jar, and is designed to form the jelly directly into molded shape when filling the jars for sale, so that it may be taken out and served in neat and convenient manner, being specially adapted for hotel, restaurant, and family use.

The invention relates to a jar with a number of interior compartments of suitable shape, and a rim that extends to suitable height above the compartments, for the purpose of containing a portion of jelly additional to that required to fill the compartments, and which will form the base of the molded jelly when the same is inverted.

In the drawing, A represents a jelly-jar, made of glass or other suitable material, and of round or other shape. The interior of the jar A is provided with a number of compartments, B, of cylindrical, conical, or other shape, preferably so disposed as to require a minimum quantity of glass or other material for the jar. The bottom or lowermost part of the cell-like compartments B is preferably rounded off, to facilitate, on turning the jar, the ready detaching of the jelly. The compartments B are not extended entirely up to the rim C of the jar, but to some distance below the same, so that when the jelly is filled into the jar a solid covering top portion of jelly is formed, which becomes the base part when the jar is upset, on which the jelly cylinders, cones, or other plain or ornamental bodies, molded into shape by the compartments, are supported. This imparts not only a neater appearance to the jelly, but admits the convenient cutting of the same into as many equal parts as there are compartments. The jelly may thereby be served directly from the jar in molded state without requiring any extra labor for bringing the same into suitable form.

For hotel purposes, the jars may be made of larger size and arranged with suitable ornamentation in the molding-compartments and on the top parts, so that the jelly presents, on being taken out, an elegant and attractive appearance.

Having thus described my invention, I claim as new and desire to secure by Letters Patent—

A jelly-jar made with a number of interior molding-compartments, and with a rim extending above the same, substantially as and for the purpose specified.

NICHOLAS P. TODD.

Witnesses:
PAUL GOEPEL,
C. SEDGWICK.